M. B. LLOYD.
METHOD OF PRODUCING WOVEN REED ARTICLES.
APPLICATION FILED FEB. 6, 1917.
1,243,081.
Patented Oct. 16, 1917.
2 SHEETS—SHEET 1.
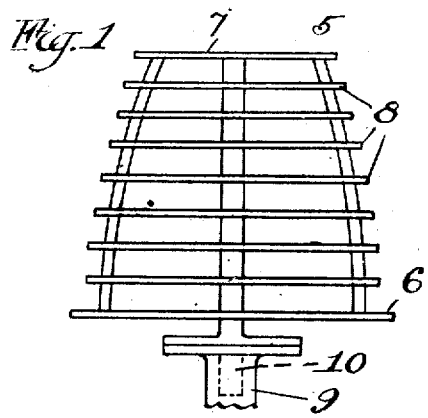
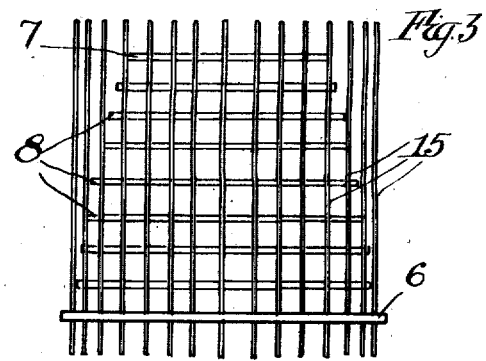
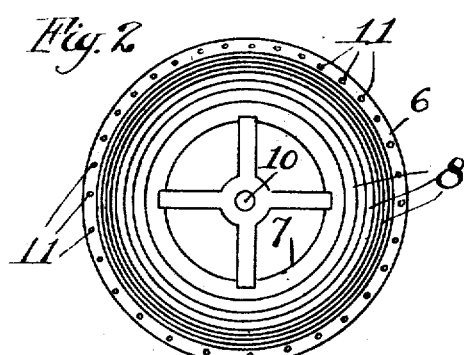
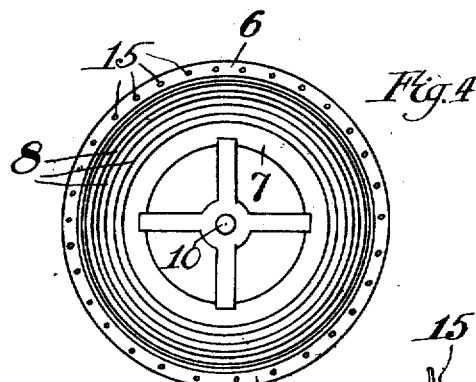
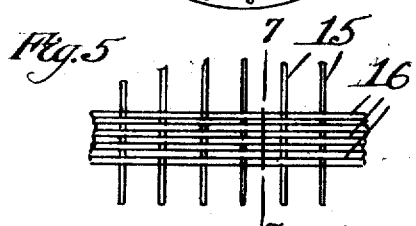
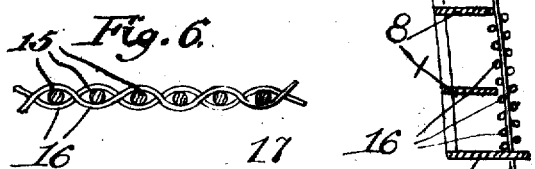
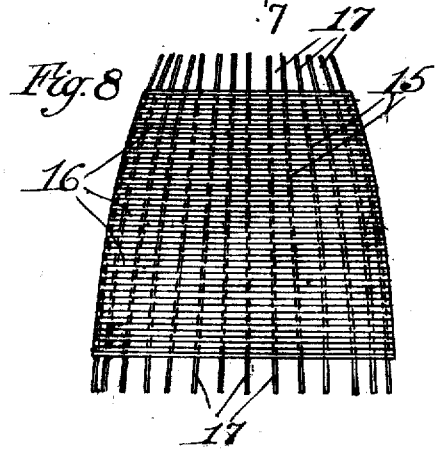
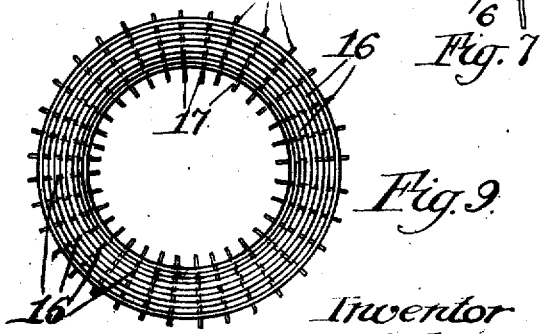
Inventor
Marshall B. Lloyd
by Arthur Wm Nelson
Atty M. B. LLOYD.
METHOD OF PRODUCING WOVEN REED ARTICLES.
APPLICATION FILED FEB. 6, 1917.
1,243,081. Patented Oct. 16, 1917.
2 SHEETS—SHEET 2.
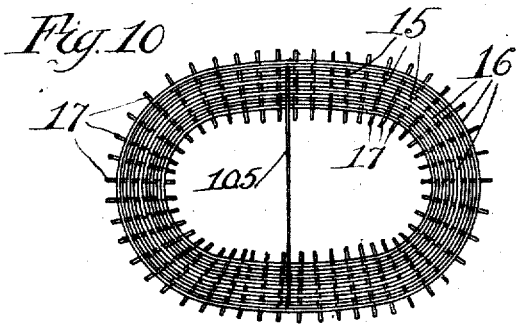
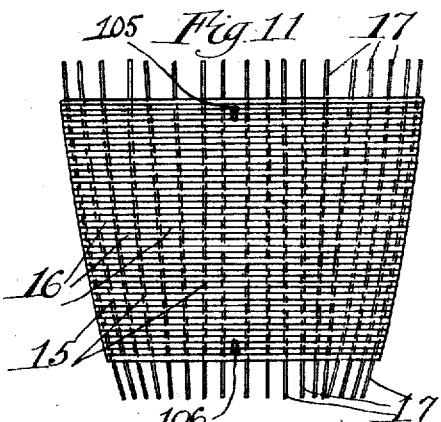
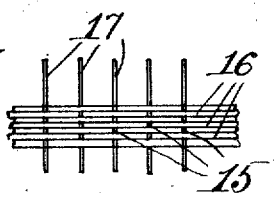
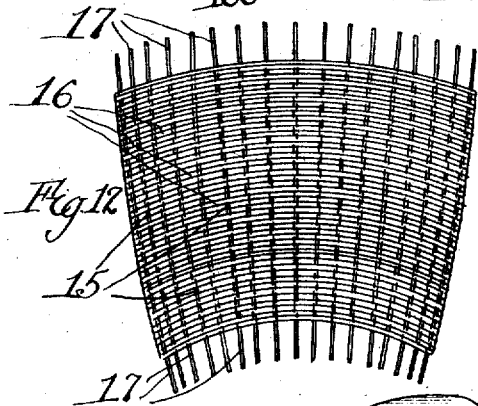
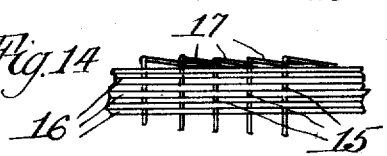
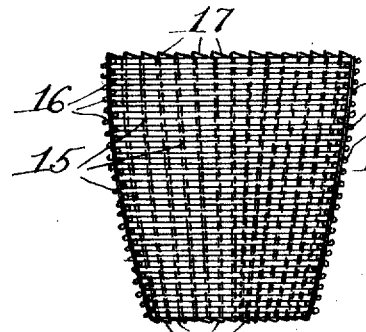
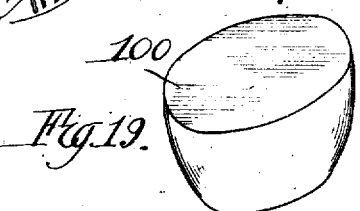
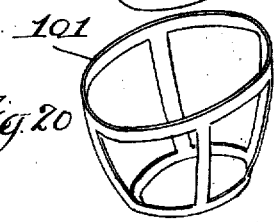
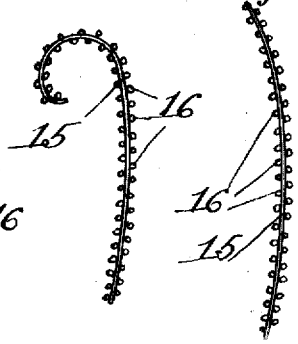
Inventor
Marshall B. Lloyd
by
Atty

UNITED STATES PATENT OFFICE.

MARSHALL B. LLOYD, OF MENOMINEE, MICHIGAN.

METHOD OF PRODUCING WOVEN REED ARTICLES.

1,243,081.     Specification of Letters Patent.     Patented Oct. 16, 1917.

Continuation in part of application Serial No. 109,714, filed July 17, 1916. This application filed February 6, 1917. Serial No. 146,910.

*To all whom it may concern:*

Be it known that I, MARSHALL B. LLOYD, a citizen of the United States, and a resident of Menominee, county of Menominee, and State of Michigan, have invented a certain new, useful, and Improved Method of Producing Woven Reed Articles, of which the following is a specification.

My invention relates generally to the manufacture of woven reed articles and relates more particularly to the manufacture of such reed articles as do not have a supporting frame.

The reed fabric with which my invention is concerned is composed of a plurality of spaced members called stakes, which may be of reed or wire and which in workable lengths have sufficient rigidity to be self-supporting and to resist considerable force tending to bend or kink abruptly. In this respect at least they differ greatly from the loose character of the threads of cloth which can be bent, twisted, or kinked in almost any manner with little force and without materially injuring them. Upon these stakes long strands called fillers, are woven over some of the stakes and under others. For example, the filler strand in some instances may pass over one stake and under the next adjacent stake, or it may pass over one stake and under the next two adjacent stakes, or it may vary in the manner in which it weaves under and over the stakes in a great many ways to produce different results and effects. The reed fabric with which my invention is concerned is also to be distinguished from cane fabric, such as is extensively used for chair seats and the like. While the filler strands may be and sometimes are put under such tension as will gradually curve or shape stakes, to the end that the finished fabric will have the desired form, the stakes are not usually abruptly bent or displaced by the filler strands, but on the other hand, the filler strands are bent and shaped to inter-weave around stakes.

In manufacturing reed articles under the prior practice, it has been the universal practice to weave the fabric free hand and for the reed worker to shape the article in the process of weaving to the desired form.

If the article is one that is irregular in shape, the stakes, during the weaving operation, project at various widely diversified angles. During the weaving operations, under the hitherto universal practice, these stakes must be constantly shaped, positioned, and alined, so that the fabric will assume the desired shape and also will have an appearance of uniformity and particularly to the end that the stakes shall assume regular lines. The operation of weaving and shaping the reed fabric is a most difficult one because of these many variable factors and hence require highly skilled workmen, so much so that where there is any substantial amount of shaping, as is necessary under present methods, in an article having pleasing curved lines, only workers having several years of experience can be employed and then the time required is considerable even to manufacture a relatively small article. As a result of the foregoing facts reed articles, while extensively used, are at the present time expensive.

The general object of my invention is to provide a method wherewith it shall be possible to weave reed articles with greater rapidity and at lower cost than has hitherto been possible.

Further objects of my invention are to provide a method of weaving reed articles in which many of the hitherto variable elements or factors shall be eliminated; wherewith artistic articles having curved or irregular lines can be produced with substantially the same ease as the straight, uniform, and simple articles; with which it shall be possible to weave the reed fabric with greater uniformity and with increased strength; wherewith unskilled workers can produce reed articles of the kind hitherto producible only by the most skilled workmen; and wherewith the hitherto highly individualistic weaving of each reed article to desired form can be reduced to a factory system of weaving the reed fabric in a form convenient for the weaving operation and then re-shaping or reforming the article to secure the desired permanentized shapes and effects.

My invention consists generally in the manner, steps, acts, and sequence thereof, whereby the above objects together with others which will appear hereinafter are attainable; and my invention will be more readily understood by reference to the accompanying drawings illustrative thereof, and wherein:

Figure 1, is a side elevation of a templet, guide or form upon which I prefer in some instances to weave the fabric.

Fig. 2, is a plan view of the device shown in Fig. 1.

Fig. 3, illustrates the manner in which I weave the fabric.

Fig. 4, is a plan view of the mechanism shown in Fig. 3.

Fig. 5, is a detail of the fabric in the course of manufacture.

Fig. 6, is a cross-section of the fabric.

Fig. 7, is a detailed view substantially on the line 7—7 of Fig. 5.

Fig. 8, is a side elevation of the finished fabric apart from the templet.

Fig. 9, is a plan view of the finished fabric, in the condition shown in Fig. 8.

Fig. 10, is a plan view illustrating the fabric inverted and in re-shaped condition but before the stakes are laid down.

Fig. 11, is a side view of the fabric in the condition shown in Fig. 10.

Fig. 12, is a side view illustrating a still further step, embodying my invention, that may be taken in the production of a reed article.

Figs. 13, and 14, illustrate a method of finishing the fabric edge and permanentizing the fabric in re-shaped condition.

Fig. 15, is a vertical transverse cross section through the finished article.

Figs. 16, and 17, and 18, illustrate a method of giving different shapes to the fabric by treatment of the marginal portions thereof; and Figs. 19 and 20, illustrate form or shaping devices which may be used where necessary to hold the fabric in re-shaped condition until set.

For the purposes of illustration, I have chosen to depict the manufacture of a somewhat elliptical flaring reed article because such articles on the one hand fairly illustrate the difficulties encountered in the production of reed articles under the hitherto universal method, and on the other hand the ease and simplicity of manufacturing articles under any method. In order better to understand the difficulties of weaving reed articles of this kind in the hitherto customary manner I shall first briefly describe that method. In order to secure the bowed or curved shape in the fabric, as best shown in Fig. 15, it has been necessary to start with the stakes projecting substantially at right angles with relation to the side of the finished article. The reed workers, having positioned the stakes in this manner, start at the bottom and weave the filler strand over and under the stakes, at the same time shaping the stakes upwardly and placing the filler strands under just the right tension so that the stakes can be gradually turned from their right-angular positions progressively upward. To shape these divergent stakes gradually upwardly, to maintain them in proper spaced relation, and to shape the filler strand with just that degree of tension necessary to give the desired shape and character to the fabric, is difficult indeed because of the many variable factors which must be considered and for which compensation must be made.

I have solved this difficult complex problem in a very simple way by eliminating many of the variable factors and reducing the remaining ones to simple easily understood and easily manipulated steps. To this end instead of weaving the fabric in the form or shape desired, which is usually an irregular shape, and which at best is poorly adapted for convenient weaving, I weave the fabric in a manner more convenient for the weaving operation and then re-shape the fabric in a manner to secure desired shapes and effects. As will be better understood, shortly, in this way, I secure freedom of movement and convenience in weaving which largely eliminate the present difficulties. Again I may grip, space, and hold the stakes in such a way and in relation to a mechanical guide, templet, or form so that the most unskilled worker can weave the fabric by simply weaving in a natural manner around or against the templet or form. The templet is of such character that the fabric produced thereon will be of desired size, but the templet is not of the same shape as the article desired but is designed to facilitate weaving, the desired shape being attained by the re-shaping operation.

While my method is not to be considered limited to the manufacture of the fabric about a templet, except where so limited in the claims, I shall describe my invention with reference to the manufacture of the fabric about a templet because this is often the preferable mode of procedure inasmuch as unskilled workers can be more readily employed and in any event the articles produced will be of more uniform size and shape than when produced without a templet.

In the drawings 5, represents a suitable templet upon which I weave the fabric and which in this instance comprises a lower annulus 6, and an upper annulus 7, between which are a plurality of members 8, which serve as guides, limiting devices, or restraining elements as will be hereinafter more fully described. It so happens in this instance that it is desirable that the side of the article shall have a gentle bow as indicated in Fig. 15, and for this reason I prefer to make the sizes and relation of the guides 8, in such a manner that a line connecting their peripheries is curved or bowed. The templet 5, is preferably mounted for rotation, although this is a mere matter of convenience, upon a support 9, by any suitable means; such for example, as the vertical shaft 10, which is secured centrally of the templet and which has a projecting portion entering a socket in the support. In the lower annulus 6, are a number of holes 11, suitably spaced in which the stakes 15, are placed and from which they upstand as illustrated in Figs. 3 and 4. These stakes it will be noted, upstand in regular form and encircle the templet guides 8. It is a most simple operation for the worker to weave the filler strands upon the stakes in this condition, it being but necessary to continue the filler strand or strands over and under the stakes and around the templet in regular courses from the bottom to the top, or conversely from the top to the bottom if desired, although I find it more convenient to work from the bottom upwardly. The filler strands are pulled so that the stakes just follow the guides 8, of the templet substantially as indicated in Fig. 7. The templet, therefore, so limits the movement of the stakes and the tension upon the filler strands that the fabric is naturally shaped to the form of the templet. The relatively close relation of the guides 8, prevent the stakes from being bent in beyond the desired point or line. In this manner an endless fabric having uniform courses of the filler strand can be produced rapidly by even an unskilled worker. The completed fabric is shown in Figs. 8 and 9, wherein 15, are the stakes and 16, the filler strands. In this instance I have left portions 17, of the stakes projecting from the body of the fabric at each end, the purpose of which will be shortly described. Having thus produced a reed fabric of desired size, I next proceed to re-shape it to desired permanentized shape. To secure the elliptical article of the instance case, I apply pressure to the sides of the fabric thus changing it from circular cross section to elliptical cross section as shown in Figs. 10 and 11. Of course it will be understood that to secure differently shaped articles, pressure will be applied in such places as is necessary to reshape to desired shape. I find that I can permanentize the fabric in re-shaped condition in many ways, some of which are more suitable for articles of one kind than articles of another, depending somewhat upon the use to which the article is subjected. For example, I find that by simply applying pressure to re-shape the article, it will retain its re-shaped condition against reversion to its initial shape and also that its capacity to retain its re-shaped form is governed somewhat by the character of the fabric, i. e., natural reed, fiber reed, etc. With fabric of some kinds it may be necessary to hold in re-shaped condition for a time to permit the fabric to become permanently reset. The re-shaping of such fabric as is to be held for a time pending setting may be conveniently carried out by means of the devices shown in Figs. 19 and 20. Therein 100 represents a form or block of the shape desired in the re-shaped article and which in this instance is shown somewhat elliptical, on a reduced scale, to produce the elliptical article under consideration. 101 is a follower of similar shape but enough larger to fit over the block or form 100 and to accommodate the fabric therebetween. Thus the completed fabric as shown in Figs. 8 and 9, can be re-shaped and placed over the form or block 100 and then the follower 101 placed over the fabric thus holding the fabric to the shape of the form or block 100. The fabric is permitted to remain between the block and follower until it has been permanently set and is then removed. I cannot state the exact time necessary as this will vary with the character of the material employed. If it has set, the fabric will retain its shape when removed from the block and follower and if upon removal any noticeable reversion to initial shape ensues it can be readily replaced upon the follower for a longer period.

I also find that when the fabric is re-shaped before the projecting stakes are laid down that the placing of the stakes to finish the edge exert a restraining influence to prevent reversion to initial shape and to permanentize the fabric in re-shaped condition. There are many ways of finishing the edge of the fabric and I have illustrated but one way in Figs. 13 and 14. The portions 17, of the stakes are bent at right angles as indicated by the dotted line (see Fig. 13) each end portion passing over the next adjacent stake and behind the second one thus producing a finished edge 15, as best shown in Fig. 14. Of course I may so finish the edges of the fabric before it is re-shaped if desired, but I have so far found it better to leave the projecting portions of the stakes and to finish them after the article is re-shaped.

By experimentation, I also find that I can further rigidly permanentize the article by re-shaping the fabric in natural condition and by then applying to the fabric one or more coats of size; such for example, as glue size. Shellac also may be used successfully for permanentizing purposes. To hold the article in re-shaped condition pending the application of the permanentizing material, bands, wires, or other suitable restraining devices may be employed. As illustrated in Figs. 10 and 11, cross wires 105 and 106, are placed above and below to hold the article in elliptical shape. These do not interfere seriously with the application of the permanentizing material and are left in position until the material has dried after which they are removed; or the fabric may be re-shaped in conjunction with devices as illustrated in Figs. 19 and 20, until it retains the re-shaped form sufficiently to be removed and receive the permanentizing material without noticeable reversion to initial shape.

If desired, the fabric may be dampened before re-shaping which will facilitate the re-shaping operation and when dried in re-shaped condition will aid in giving a permanent set.

Thus it becomes apparent that the fabric can be re-shaped and permanentized in many ways, the above being sufficiently illustrative thereof.

It will be noted that the filler strands in the fabric as produced extend in regular progressive convolutions. When a curved, arched or irregular article is desired as indicated in side elevation in Fig. 12, I proceed to manufacture an article in the manner above described, with the filler strands disposed in regular convolution, re-shaping if desired, and then distorting the fabric edgewise in desired positions and to the desired extent after which the fabric can be permanentized as before described. The direction of the filler strands are thus changed as will be at once apparent by viewing Figs. 11 and 12. At this time, I might also state that I can secure different effects by folding more or less of the marginal portions of the fabric out of the plane of weave. In Fig. 16, I have folded a considerable marginal portion 60, thus producing one effect. In Fig. 17, I have folded a lesser marginal portion, thus producing a different effect; and in Fig. 18, I have not folded the marginal portion to any appreciable extent, thus producing a still different effect. These illustrations are sufficient to show the possibilities of this procedure.

In qualifying the fabric or its elements as "reed" in the specification or claims, I mean to limit my invention to fabric, the elements of which coöperate in the manner above described as characteristic of the stake and strand fabric made of reed, but to embrace such materials whether they be the natural reed, paper reed, or other materials having the general characteristics of reed.

For some articles, templet, forms, or mechanical guides of different sizes, shapes and character will be employed, but my method will be found to be characterized by weaving the reed fabric in a manner convenient for the weaving operation and then re-shaping to permanentized shape of desired form, as distinguished from the hitherto universal practice of shaping the article as in a manner which is inconvenient, slow, laborious and dependent upon a high degree of skill in the workman. With my method, by providing relatively few templets of different sizes and shapes, reed articles in great variety can be produced rapidly by unskilled workers and at relatively low cost.

Inasmuch as this disclosure will readily suggest to others skilled in the art to which this appertains, various methods whereby the substantial objects of my invention can be attained, I do not wish to be limited to the specific stated manner of procedure nor to the precise steps, acts, or stated sequence thereof, except only as may be necessary by limitations in the hereunto appended claims.

I claim:—

1. The method of manufacturing reed articles having an endless fabric which consists in weaving the fabric in an endless shape different from the desired endless fabric and in re-shaping the fabric, out of its plane of weave, to desired shape.

2. The method of manufacturing reed articles having an endless fabric which consists in weaving the reed fabric, about a templet, in endless shape different from the desired endless shape and in re-shaping the fabric, out of its plane of weave, to desired shape.

3. The method of manufacturing reed articles having an endless fabric which consists in weaving the fabric in an endless shape different from the desired endless shape and in folding desired marginal portions of the fabric out of its plane of weave.

4. The method of manufacturing reed articles having an endless fabric which consists in weaving the fabric, about a templet, in an endless shape different from the desired endless shape and in folding desired marginal portions out of its plane of weave.

5. The method of manufacturing reed articles having an endless fabric which consists in weaving the fabric in endless shape different from the desired endless shape and in distorting edgewise desired substantial portions of the fabric.

6. The method of manufacturing reed articles having an endless fabric which consists in weaving the fabric, about a templet, in an endless shape different from the desired endless shape and in permanently distorting edgewise desired substantial portions of the fabric.

7. The method of manufacturing reed articles of non-circular cross section which consists in weaving the fabric in circular cross section and in re-shaping the fabric to desired non-circular cross section.

8. The method of manufacturing reed articles of tubular cross section of different dimensions which consists in weaving the fabric in tubular cross section of different dimensions and in a shape different from the desired tubular shape and in re-shaping the fabric, out of its plane of weave, to the desired shape.

9. The method of manufacturing reed articles of tubular cross section of different dimensions which consists in weaving the fabric, about a templet, in tubular cross section of different dimensions and in a shape different from the desired tubular shape and in re-shaping the fabric, out of its plane of weave to the desired shape.

10. The method of manufacturing reed articles having a non-circular tubular fabric of different cross sectional dimensions which consists in weaving the fabric in tubular shape of circular cross section having different dimensions and in re-shaping the fabric to desired non-circular cross section.

11. The method of manufacturing reed articles having a non-circular tubular fabric of different cross sectional dimensions which consists in weaving the fabric, about a templet, in tubular shape of circular cross section having different dimensions and in re-shaping the fabric to desired non-circular cross section.

12. The method of manufacturing reed articles having an endless fabric with a contour curved with respect to its axis at least in part, which consists in weaving the fabric, with such curved contour at least in part, in an endless shape, different from the desired endless shape and in re-shaping the fabric, out of its plane of weave, to desired shape.

13. The method of manufacturing reed articles having an endless fabric with a contour curved with respect to its axis at least in part, which consists in weaving the fabric, about a templet, with such curved contour at least in part, in an endless shape different from the desired endless shape and in re-shaping the fabric, out of its plane of weave, to desired shape.

14. The method of manufacturing reed articles having an endless fabric which consists in weaving the reed fabric in an endless shape different from the desired endless shape, re-shaping the fabric, out of its plane of weave, to desired shape and permanentizing the fabric in re-shaped condition.

15. The method of manufacturing reed articles having an endless fabric which consists in weaving the reed fabric, about a templet, in an endless shape different from the desired endless shape, re-shaping the fabric, out of its plane of weave, to desired shape and permanentizing the fabric in re-shaped condition.

16. The method of manufacturing reed articles having an endless fabric which consists in weaving the fabric in an endless shape different from the desired endless shape, folding desired marginal portions of the fabric out of the plane of weave and permanentizing the fabric in changed condition.

17. The method of manufacturing reed articles having an endless fabric which consists in weaving the fabric, about a templet, in an endless shape different from the desired endless shape, folding desired marginal portions of the fabric out of the plane of weave and permanentizing the fabric in changed condition.

18. The method of manufacturing reed articles having an endless fabric which consists in weaving the fabric in an endless shape different from the desired endless shape, distorting edgewise desired substantial portions of the fabric and permanentizing the fabric in changed condition.

19. The method of manufacturing reed articles having an endless fabric which consists in weaving the fabric, about a templet, in an endless shape different from the desired endless shape, distorting edgewise desired substantial portions of the fabric and permanentizing the fabric in changed condition.

20. The method of manufacturing reed articles of tubular cross section and of different cross sectional dimensions which consists in weaving the fabric to tubular cross section of different shape and having different cross sectional dimensions, re-shaping the fabric out of its plane of weave and permanentizing the fabric in re-shaped condition.

21. The method of manufacturing reed articles of tubular cross section and of different cross sectional dimensions which consists in weaving the fabric, about a templet, to tubular cross section of different shape and having different cross sectional dimensions, re-shaping the fabric out of its plane of weave and permanentizing the fabric in re-shaped condition.

22. The method of manufacturing reed articles having an endless fabric with a contour curved, at least in part, which consists in weaving the fabric in an endless shape different from the desired endless shape and with a contour curved at least in part, re-shaping the fabric out of its plane of weave and permanentizing the fabric in re-shaped condition.

23. The method of manufacturing reed articles having an endless fabric with a contour curved, at least in part, which consists in weaving the fabric, about a templet, in an endless shape different from the desired endless shape and with a contour curved at least in part, re-shaping the fabric out of its plane of weave and permanentizing the fabric in re-shaped condition.

24. The method of manufacturing reed articles having an endless fabric which consists in weaving the fabric in an endless shape different from the desired endless shape, re-shaping the fabric, out of its plane of weave, to desired shape and applying sizing to permanentize the fabric in re-shaped condition.

25. The method of manufacturing reed articles having an endless fabric which consists in weaving the fabric, about a templet, in an endless shape different from the desired endless shape, re-shaping the fabric, out of its plane of weave, to desired shape and applying sizing to permanentize the fabric in re-shaped condition.

26. The method of manufacturing reed articles having an endless fabric which consists in weaving the fabric in an endless shape different from the desired endless shape, dampening the fabric re-shaping the fabric, out of its plane of weave, while in dampened condition and drying the fabric while in re-shaped condition.

27. The method of manufacturing reed articles having an endless fabric which consists in weaving the fabric, about a templet, in an endless shape different from the desired endless shape dampening the fabric, re-shaping the fabric, out of its plane of weave, while in dampened condition and drying the fabric while in re-shaped condition.

28. The method of manufacturing reed articles which consists in weaving the reed fabric in a shape different from the desired shape and with portions of the stakes projecting from the filler strands, re-shaping the fabric, out of its plane of weave, to desired shape, and then laying down the projecting stakes.

29. The method of manufacturing reed articles having an endless fabric which consists in weaving the fabric in an endless shape different from the desired endless shape and with portions of the stakes projecting, from the filler strands, re-shaping the fabric out of its plane of weave, and then laying down the stakes.

In testimony whereof I have hereunto set my hand, this 25th day of January, 1917, in the presence of two subscribing witnesses.

MARSHALL B. LLOYD.

Witnesses:
ARTHUR WM. NELSON,
FRANK L. SALEN.